No. 852,501. PATENTED MAY 7, 1907.
H. C. FRESHOUR.
BATH AND BASIN STOPPER.
APPLICATION FILED SEPT. 1, 1905.

WITNESSES
H. A. Lamb
L. W. Atherton

INVENTOR
Henry C. Freshour
BY
N. M. Wooster
ATTORNEY

UNITED STATES PATENT OFFICE.

HENRY C. FRESHOUR, OF BRIDGEPORT, CONNECTICUT, ASSIGNOR TO THE H. O. CANFIELD COMPANY, OF BRIDGEPORT, CONNECTICUT, A CORPORATION OF CONNECTICUT.

BATH AND BASIN STOPPER.

No. 852,501.  Specification of Letters Patent.  Patented May 7, 1907.

Application filed September 1, 1905. Serial No. 276,721.

*To all whom it may concern:*

Be it known that I, HENRY C. FRESHOUR, a citizen of the United States, residing at Bridgeport, county of Fairfield, State of Connecticut, have invented a new and useful Bath and Basin Stopper, of which the following is a specification.

This invention relates to stoppers for bathtubs, basins, &c., said stoppers comprising elastic bodies which are usually formed of a rubber compound, a stud being employed to enable the body to be attached to a chain.

The demands of the trade require that the studs shall be plated; but heretofore difficulty has been experienced in making entirely satisfactory stud-stoppers for several reasons. For instance, when the plastic body is molded with a cavity and one end of the stud afterward pushed into the cavity the permanency of the connection is not certain. The stud is liable to be pulled out of the body. When the plastic body is formed with a hole extending completely through it and one end of the stud then passed through the aperture and secured by a washer and screw or by heading down the end of the stud, there is always liable to be some leakage around the stud, because the body of the stud is nowhere continuous transversely. Another objection to this latter form of stopper is the increased expense of the washer or screw or the cost of the operation of heading down the end of the stud. A difficulty that has presented itself to molding the body of plastic material directly on and around the stud has been the liability and almost certainty of ruining the plating of the projecting end of the stud by the rubber compound being forced down over said end in the mold.

My present invention provides a perfectly satisfactory stopper comprising a plated stud having one end firmly and permanently embedded and anchored in the rubber compound body without passing through it and with the plating of the projecting end of the stud entirely unimpaired. This result I accomplish by the molding process described and claimed in my Patent No. 837,679 granted December 4, 1906.

Figure 1:
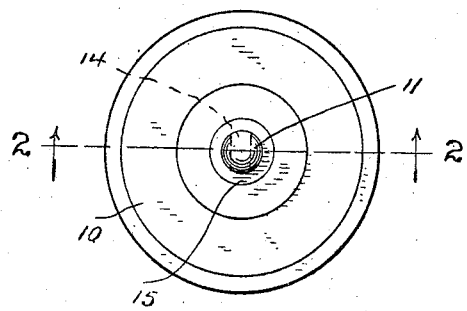
Figure 2:
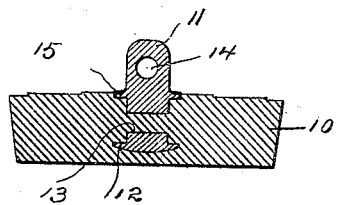
Figure 3:
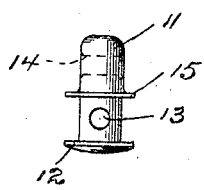

In the accompanying drawing forming a part of this specification—Figure 1 is a plan view of my novel stopper with a stud molded therein. Fig. 2 a section on the line 2—2 in Fig. 1, and Fig. 3 is an elevation of the stud detached.

10 denotes the stopper which may be molded to any desired form from a plastic rubber compound and 11 the stud which is provided at its lower end with an enlargement 12 which may be of any preferred form and serves as an anchor to prevent the possibility of the stud being pulled out from the stopper. The inner end of the stud may or may not be provided with a transverse hole 13 into which the plastic compound is forced in the operation of molding, serving as an additional means for anchoring the stud in the stopper and for retaining it against rotation. At the outer end of the stud is a transverse hole 14 which receives the usual chain ring, not shown. Hole 14 is shown as made transversely to hole 13 although of course this is immaterial so far as the present invention is concerned. The gist of the present invention lies in providing the stud with a flange 15 which lies upon the top of the completed stopper and lies just within the mold in the process of molding. The function of this flange is to prevent the plastic compound from being forced out of the mold in the process of molding and down upon the outer end of the stud, hereby ruining the plating. This is because, as will be readily understood even without reference to my said Patent No. 837,679, the end of the stud to which the usual chain is to be attached is received in a hole or recess of one of the mold members, and the flange 15 closes the end of said hole or recess and completely prevents the passage of plastic material into or through it. Therefore, the plating of the portion of the stud which projects from the elastic body 10 is unimpaired by the process of molding, and a stopper is provided having the stud and elastic body inseparably connected solely by a molding process requiring no further operation to complete it.

Having thus described my invention, I claim:—

A bath or basin stopper of the character described comprising a plated stud and a plastic material body molded on the stud, said stud being provided with a flange lying upon the outer side of the plastic body to completely prevent the passage of plastic material to the outer end of the stud during the molding operation, the flange being embedded in the material of the plug.

In testimony whereof I affix my signature, in presence of two witnesses.

HENRY C. FRESHOUR.

Witnesses:
  A. M. WOOSTER,
  S. W. ATHERTON.